Jan. 20, 1970  C. A. EVERSMAN  3,490,493
VOLUME AND MIXTURE CONTROLLABLE VALVE ASSEMBLY
Filed Nov. 30, 1966  5 Sheets-Sheet 3

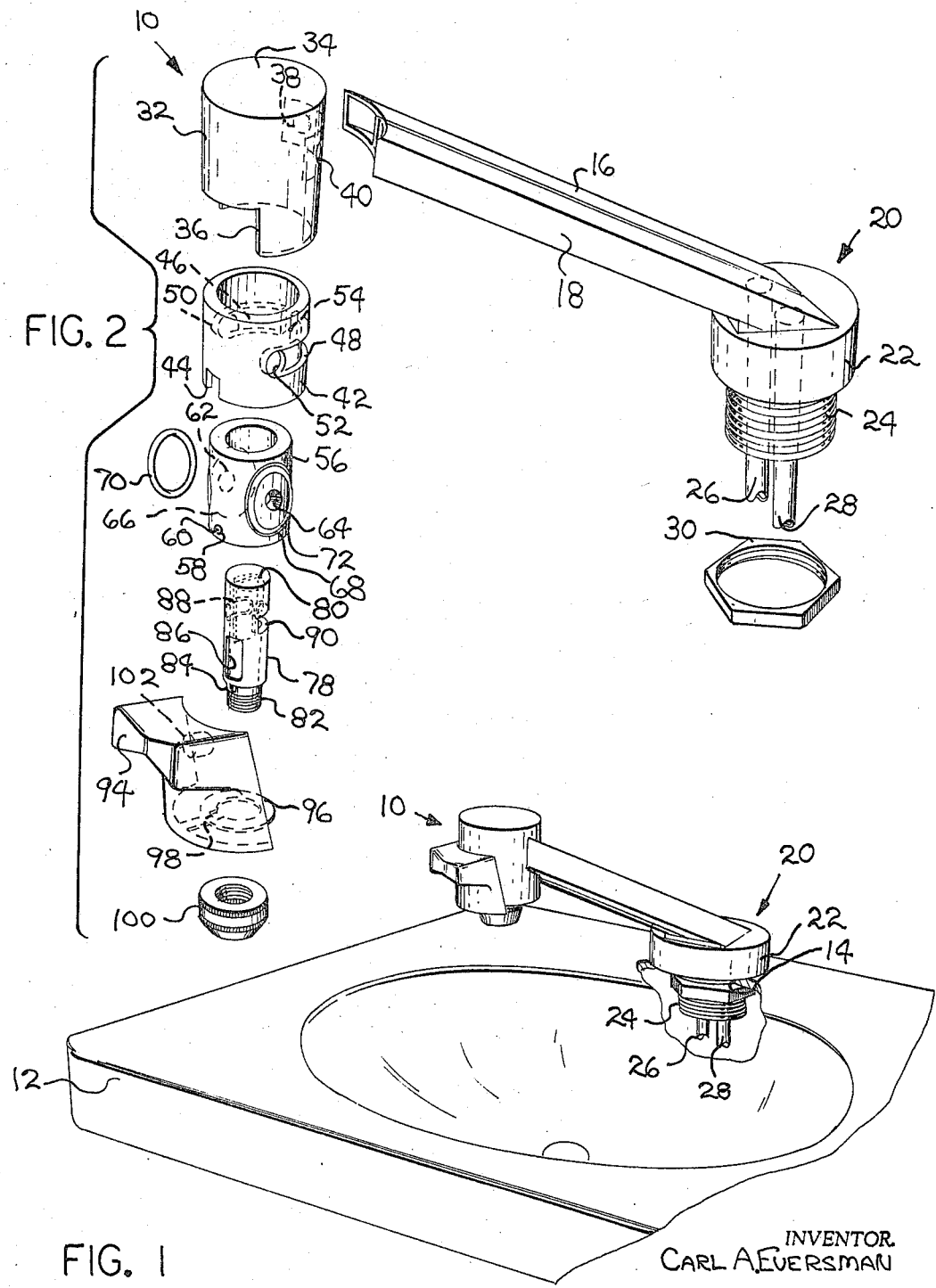

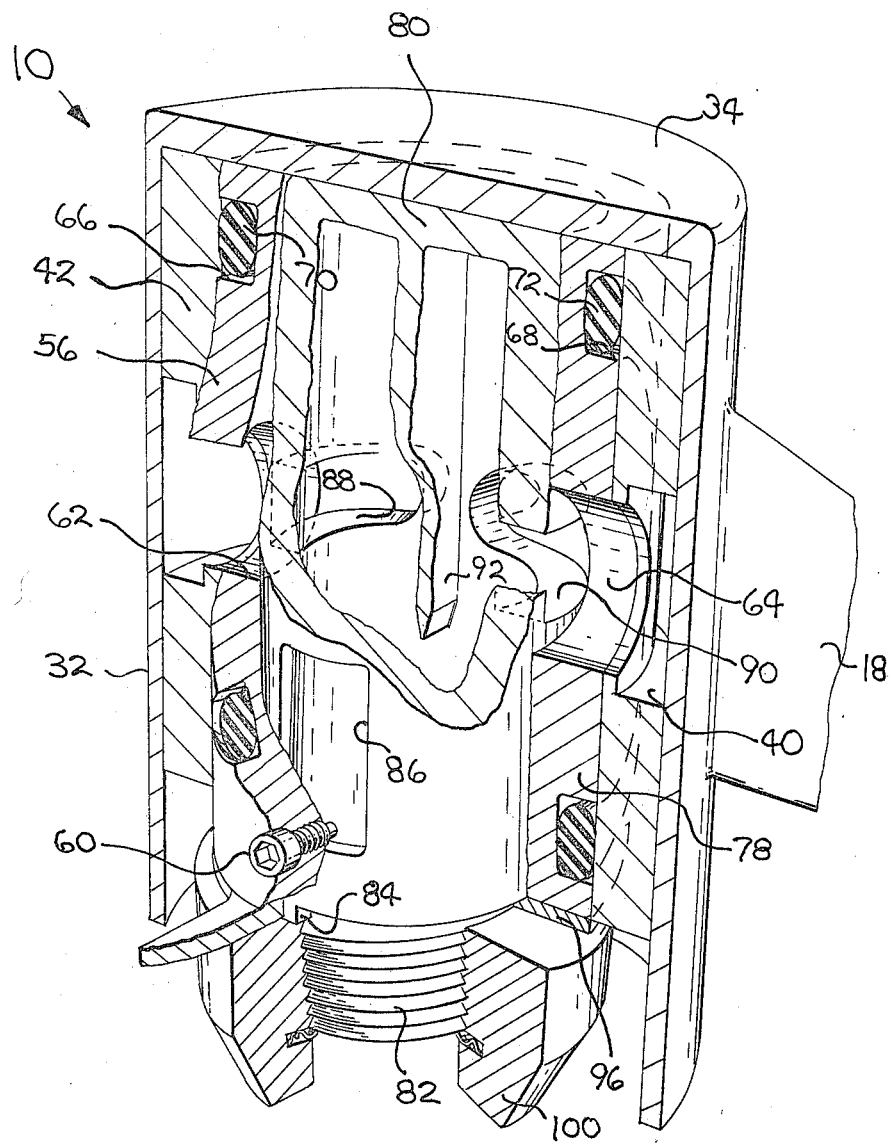

INVENTOR.
CARL A. EVERSMAN
BY
ATTORNEYS

Jan. 20, 1970            C. A. EVERSMAN            3,490,493

VOLUME AND MIXTURE CONTROLLABLE VALVE ASSEMBLY

Filed Nov. 30, 1966            5 Sheets-Sheet 4

INVENTOR.
CARL A. EVERSMAN
BY
ATTORNEYS

INVENTOR.
CARL A. EVERSMAN
ATTORNEYS

United States Patent Office 3,490,493
Patented Jan. 20, 1970

3,490,493
VOLUME AND MIXTURE CONTROLLABLE
VALVE ASSEMBLY
Carl A. Eversman, 2943 Manchester Drive,
Toledo, Ohio 43606
Filed Nov. 30, 1966, Ser. No. 597,956
Int. Cl. F16k 19/00; G05d 11/03
U.S. Cl. 137—625.17          10 Claims

ABSTRACT OF THE DISCLOSURE

A valve assembly for controlling the flow of fluid from a source including a valve cylinder having at least one port means and a hollow cylindrical valve piston disposed within the valve cylinder for axial and rotational movement therein wherein a fluid tight sealing relation is maintained by coaction between the inner peripheral wall of the valve cylinder and the outer peripheral wall of the valve piston, and the valve piston having an outlet port at one end thereof and a pair of circumferentially spaced inlet ports in the cylindrical wall thereof selectively alignable with the port means of the valve cylinder.

---

The present invention relates to valve assemblies and more particularly to a fluid control mixing valve.

One of the primary objects of the invention is to produce a fluid control mixing valve structure which is simple in construction and may be readily operated by one hand of an operator.

Another object of the invention is to produce a fluid control mixing valve wherein the mixing of two separate fluid supplies may be achieved by effecting movement of the actuating handle about the longitudinal axis of the valve and the volume of the mixed fluid passing through the valve may be controlled by movement of the actuating handle along the longitudinal axis thereof.

A further object of the invention is to produce a fluid control mixing valve which requires no gasket material between the moving parts of the valve.

A further object of the invention is to produce a fluid control mixing valve employing a novel static fluid pressure sealing means.

The above and other objects of the invention may be readily achieved by a fluid control mixing valve structure comprising a valve cylinder having a pair of circumferentially spaced inlet ports communicating respectively with a first and a second source of fluid; a hollow cylindrical valve piston disposed within the valve cylinder for axial and rotational movement therein, the peripheral inner wall of the valve cylinder and the peripheral outer wall of the valve piston being in fluid-tight sliding relation, the valve piston having an outlet port at the open end thereof and a pair of circumferentially spaced inlet ports in the cylindrical wall thereof, a deflecting partition wall disposed in the interior of the valve piston between the inlet ports thereof; means for limiting the axial and rotational movement of the valve piston relative to the valve cylinder; and a manual actuator affixed to the valve piston whereby axial and rotational movement of the valve piston can be effected to selectively position the inlet ports thereof relative to the respective inlet ports of the valve cylinder.

Other objects and advantages of the invention will be clearly apparent to those skilled in the art by reading the following detailed description of an embodiment of the invention when considered in the light of the accompanying drawings, in which:

FIGURE 1 is a fragmentary perspective view of a fluid control mixing valve incorporating the concepts and structure of the present invention installed in connection with a typical wash basin;

FIGURE 2 is an enlarged exploded view of the fluid control mixing valve illustrated in FIGURE 1;

FIGURE 3 is an enlarged fragmentary view partly in section illustrating the valve structure shown in FIGURE 2 in an assembled form;

FIGURE 9 is an exploded view of the fluid control mixing valve illustrated in FIGURE 8;

Figure 4:
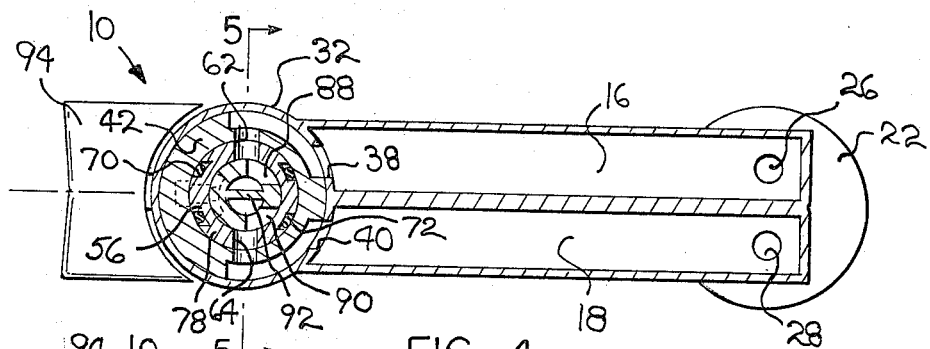
FIGURE 4 is a top view in section of the structure illustrated in FIGURES 1 and 2 illustrating the relative position of the valve piston for the maximum mixing of the incoming fluids.

Referring to FIGURES 1 through 7, inclusive, there is shown a fluid control mixing valve structure generally indicated by reference numeral 10 which is adapted to be mounted on a fluid receptacle, such as a conventional wash basin or sink 12 having a receiving aperture 14 formed in the rear portion of the upper horizontal surface thereof. The valve structure 10 communicates with a source of hot water supply and cold water supply through a pair of parallel coextensive channels 16 and 18, respectively. One of the respective ends of the channels 16 and 18 is connected to a fitting 20, while the opposite ends of the channels are suitably affixed to the valve structure 10, as will be explained in greater detail thereinafter. The fitting 20 is provided with a main body portion 22 having a depending externally threaded portion 24. Within the interior of the fitting 20, there is a pair of pipes 26 and 28 which communicate with the hot and cold water supply sources, respectively. The fitting 20 is typically installed in the wash basin or sink 12 in such a fashion that the threaded portion 24 extends through the aperture 14 and a nut 30 is installed thereon and tightened until the bottom of the main body portion 22 is snugly seated against the upper surface of the wash basin 12 defining the aperture 14.

The valve structure 10 includes a body shroud 32 which is generally cylindrical in shape and has a closed top wall 34 and an open bottom with a cut-out section 36. At the opposite side from the cut-out section 36 there are two spaced apart ports 38 and 40 which are aligned with the channels 16 and 18, respectively. Disposed within the interior of the body shroud 32 and typically sweat fitted thereto, there is a body inner or sleeve 42 which is cylindrical in shape and open at both ends. A notch 44 is formed adjacent the bottom edge of the sleeve 42. At the opposite side of the sleeve 42, there are formed two oppositely extending circumferential passages 46 and 48 terminating in substantially diametrically opposed ports 50 and 52, respectively. The opposite ends of the passages 46 and 48 are separated by a dividing wall 54. The passages 46 and 48 are adapted to communicate with the ports 38 and 40, respectively.

Within the interior of the sleeve 42 is disposed a valve cylinder 56 which is generally in the shape of an open ended sleeve and is retained therein by a suitably positioned threaded fastener extending through the body shroud 32 and the body inner 42, not shown. Aligned with the notch 44 of the body inner 42 is an internally threaded aperture 58 for receiving an externally threaded set screw 60. A pair of ports 62 and 64 are formed in the side wall of the valve cylinder 56 diametrically opposed to each other. Concentrically about each of the ports 62 and 64 there is formed a substantially circular channel 66 and 68, respectively, for receiving respective static seal forming O-rings 70 and 72. It will be noted from an examination of FIGURE 3 that the inner walls of the channel 66 and 68 are undercut for holding or retaining the O-rings 70 and 72 during the assembly of the valve structure. The O-rings 70 and 72 may be formed of a material such as rubber, urethane, and other similar resilient materials. The inner peripheral wall of the valve cylinder 56 is machined to provide an extremely smooth annular surface.

A valve piston 78 is slidingly disposed within the interior of the valve cylinder 56. The valve piston 78 has a closed top wall 80 and an open bottom. Adjacent the open bottom, there is formed an externally threaded section 82 at the upper terminus of which is provided a depending shoulder 84. Above the shoulder 84 is a slotted or milled zone 86 of generally rectangular shape. Above the upper end of the slotted zone 86 and on the opposite side of the valve piston is a pair of elongate ports 88 and 90. The ports 88 and 90 extend circumferentially of the valve piston 78 with their adjacent ends being arcuately shaped and the opposite ends being straight and parallel to the longitudinal axis of the valve piston.

Within the interior of the valve piston 78 and depending from the top wall 80, there is a dividing diverter partition wall 92 which effectively militates against any direct passage of a fluid immerging from one of the ports 88 and 90 from entering the opposite port.

In the assembled form, the innermost end of the set screw 60 projects into the slotted zone 86 of the valve piston 78 thereby limiting the axial and rotational movement of the valve piston 78 relative to the valve cylinder 56. The valve piston 78 has a well machined outer peripheral surface to provide a fluid-tight sliding fit within the interior of the valve cylinder 56.

An actuator knob or handle 94 is coupled to the valve piston 78 through an attaching bracket 96 having a notch 98 which receives the shoulder 84 of the valve piston. The actuator handle 94 is fixedly secure to the valve piston 78 by an internally threaded member 100 which may in the form of an aerator. The threaded member 100 is threadably assembled on the externally threaded portion 82 of the valve piston 78 to adequately retain the actuator handle 94 on to the valve piston 78. On the inner arcuate surface of the actuator handle 94, there is disposed a friction element 102 which in the assembled form of the valve assembly, lightly bears against the outer wall of the shroud 32 to militate against any retrograde movement of the actuator handle 94 and the associated valve piston 78 once the desired setting of the assembly has been reached. Typically, the friction element 102 can be formed of a plastic material such as Teflon, nylon, or the like.

Figures 5, 7:
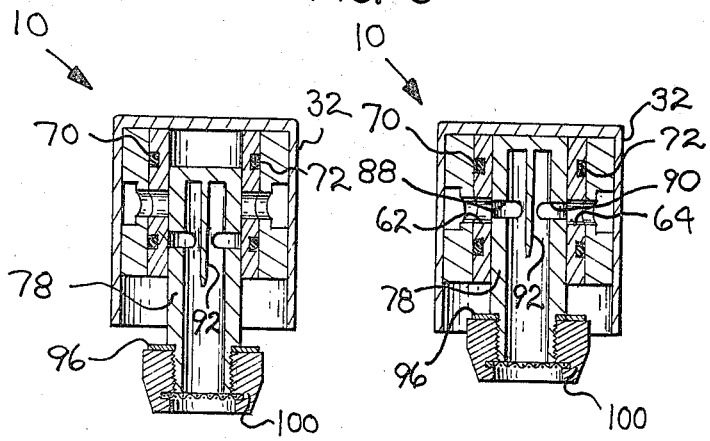
FIGURE 5 is a sectional view of the valve structure taken along line 5—5 of FIGURE 4.
FIGURE 7 is a sectional view of the valve structure illustrated in FIGURE 5 showing the valve piston in the fully "off" position.
Figure 12:
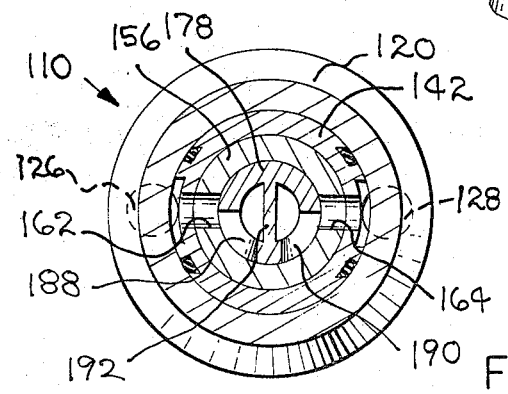
FIGURE 12 is a sectional view of the valve structure taken along line 12—12 of FIGURE 11.

In operation, the actuator handle 94 is moved from its normally closed position upwardly to simultaneously move the valve piston 78 axially upwardly within the valve cylinder 56 until the bottom of the slotted zone 86 contacts the innermost end of the set screw 60. This position of the valve assembly is illustrated in FIGURES 4 and 5 wherein the inlet ports 88 and 90 of the valve piston 78 are in alignment with the inlet ports 62 and 64, respectively, of the valve cylinder 56. In the illustrated position, there is a balanced flow of fluid from both sources of fluid supply, as clearly illustrated in FIGURE 4. From an examination of FIGURE 5, it will be observed that a maximum flow of fluid is permitted. The fluid entering the valve assembly 10 from the channels 16 and 18 will be of equal quantities and in the event of hot and cold water being supplied to the assembly, a mixture of like quantities of each will occur in the hollow interior of the valve piston 78 within a zone below the diverter partition wall 92.

Figure 6:
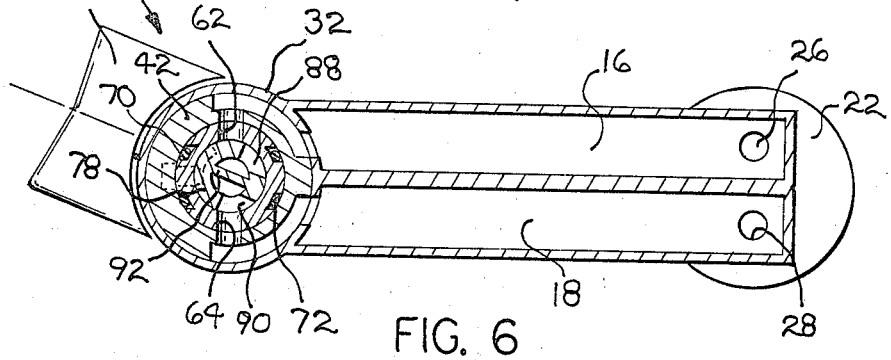
FIGURE 6 is a top view in section similar to FIGURE 4 showing the relative position of the valve piston for permitting the maximum flow of a single fluid.

If the actuator handle 94 is maintained at the same axial position and rotated in a clockwise direction to the position illustrated in FIGURE 6, the volume of fluid passing through the assembly will be unchanged, but the introduction of the fluid passing through the channel 16 will be cut-off and only the fluid passing through the channel 18 will be permitted to pass through the valve assembly 10. Manifestly, if the actuator handle 94 were rotated in a counterclockwise direction the fluid in the channel 18 would be cut-off and only the fluid in the channel 16 would be permitted to flow through the valve assembly 10. It must be understood that the inlet ports 88 and 90 are so formed that the total volume of fluid entering the mixing zone within the hollow interior of the valve piston 78 remains constant regardless of the rotational movement of the actuator handle 94 and the associated valve piston 78. The amount of rotational movement is limited by the co-action between the inner end of the set screw 60 and the associated slotted zone 86. To reiterate, when the valve piston is in the position illustrated in FIGURE 3, for example, the bottom side wall of the slotted zone 86 is in contact with the inner end of the set screw 60 and a maximum volume of fluid is allowed to pass through the valve assembly 10; and alternatively, when the valve piston is lowered to the position shown in FIGURE 7 wherein the innermost end of the set screw 60 is in contact with the upper horizontal edge of the slotted zone 86 the valve assembly is in an "off" position, the ports 88 and 90 being out of alignment with the associated ports 62 and 64 of the valve cylinder 56. Further, it will be appreciated that the movement of the valve piston axially from the position illustrated in FIGURE 5 to that illustrated in FIGURE 4 will affect a continuous decrease in the amount of fluid flowing through the valve assembly 10 from the maximum to the cut-off position.

In the case of a hot and cold water system, rotational movement of the actuator handle 94 and its associated valve piston 78 will effect a change in the temperature of the water emitted from the valve structure directly in relation to the degree of rotation. When the actuator handle 94 is in one of its extreme positions, the temperature of the water emitted will be hot and, as the actuator handle 94 is rotated toward the opposite extreme position, the water emitted will become tepid and finally cold as the actuator handle and the valve piston arrive at the opposite extreme position. Axial movement of the actuator handle 94 and its associated valve piston 78 will effect a change in the volume or amount of water emitted.

Very satisfactory results of the valve assembly described hereinabove have been achieved by forming the valve cylinder 56 and the valve piston 78 of stainless steel or hard chromium plated brass. It is believed, however, that other materials could be satisfactorily employed. In a typical valve assembly it has been found that the proper sealing relationship can be achieved between the valve piston 78 and the valve cylinder 56 by providing a 0.0005 inch tolerance between the outside diameter of the valve piston 78 and the inside diameter of the valve cylinder 56.

Referring to FIGURES 8 through 13, inclusive, there is shown a modified form of the fluid control mixing valve structure illustrated and described thereinbefore. The valve structure is generally indicated by reference numeral 110 and is adapted to be mounted on a fluid receptacle such as a conventional sink or wash basin 112 having a suitable receiving aperture 114 formed in the rear portion of the upper horizontal surface thereof. The valve structure or assembly 110 typically communicates with the source of hot water supply and the cold water supply through a pair of pipes 126 and 128, respectively. The pipes 126 and 128 are connected to a fitting 120 which is provided with a main body portion 122 having a depending externally threaded portion 124.

The fitting 120 is further provided with a hollow cylindrical interior portion 132 which is in communication with the terminal portions of the pipes 126 and 128.

The fitting 120 is typically installed on the wash basin or sink 112 in such a fashion that the threaded portion 124 extends through the aperture 114 and a nut 130 is installed thereon and tightened until the bottom of the main body portion 122 is snugly seated against the upper surface of the wash basin or sink 112.

The valve structure or assembly 110 comprises a body inner or sleeve 142 which is cylindrical in shape and open at both ends. A notch 144 is formed adjacent the bottom edge of the sleeve 142. At opposite sides of the sleeve 142, there are formed a pair of diametrically opposed ports 150 and 152, each having an associated downwardly extending channel 146 and 148, respectively, extending downwardly to the bottom surface of the sleeve 142. The sleeve 142 is further provided with an internally threaded portion 154 near the upper end thereof. The sleeve 142 is inserted in to the hollow interior 132 of the fitting 120 such that the passages 146 and 148 communicate directly with the outlet ends of the pipes 126 and 128, respectively. The sleeve 142 may be sweated or otherwise tightly fitted into the hollow interior 132 of the fitting 120 to provide a permanent connection therebetween.

Within the interior of the sleeve 142, there is disposed a valve cylinder 156 which is generally in the shape of an open ended sleeve. Aligned with the notch 144 of the sleeve 142 is an internally threaded aperture 158 for receiving an externally threaded set screw 160. A pair of diametrically opposed ports 162 and 164 are formed in the side wall of the valve cylinder 156. Concentrically about each of the ports 162 and 164 there is formed a substantially circular channel 166 and 168, respectively, for receiving respective static seal forming O-rings 170 and 172. It will be noted from an examination of FIGURES 10 and 11 that the inner walls of the channels 166 and 168 are undercut to provide means for holding or retaining the O-rings 170 and 172 during the assembly of the valve structure. The O-rings 170 and 172 may be formed of a resilient material such as for example rubber, urethane, and other suitable resilient sealing materials. The inner peripheral wall of the cylinder 156 is finished to provide an extremely smooth annular surface. To provide a seal between the innermost end of the valve cylinder 156 and the bottom wall of the hollow interior 132 of the fitting 120, there is provided an O-ring seal 174 to militate against the passage of any fluid beneath the bottom of the valve cylinder 156.

A valve piston 178 is slidably disposed within the interior of the valve cylinder 156. The valve piston 178 is open at both ends. Adjacent the open top, there is formed an externally threaded section 182. Below the threaded portion 182 is a slotted or milled zone 186 formed in the side wall of the valve piston 178 and is generally in the form of an inverted L. Below the lower end of the slotted zone 186 and on the opposite sides of the valve piston 178 are formed a pair of elongate ports 188 and 190. The ports 188 and 190 extend circumferentially of the valve piston 178 with their adjacent ends being typically arcuately shaped and the opposite ends being straight and parallel to the longitudinal axis of the valve piston 178.

Within the interior of the valve piston 178 and extending upwardly from the bottom thereof, there is a dividing diverter partition wall 192 which effectively militates against any direct passage of fluids between the ports 188 and 190.

In the assembled form of the valve structure 110, the innermost end of the set screw 160 projects into the slotted zone 186 of the valve piston 178 to effectively limit the axial and rotational movement of the valve piston 178 relative to the valve cylinder 156. The valve piston 178 has a well machined outer peripheral surface to provide a liquid-tight sliding fit within the interior of the valve cylinder 156.

A cap 194 having a depending externally threaded hollow portion is adapted to receive a friction element 192. In the assembled form, the friction element 192 is seated within the interior of the cap 194 and is adapted to frictionally control the movement of the valve piston 178 to permit the valve to retain the desired axial position as will be explained in greater detail hereinafter. In the assembled form the cap 194 is positioned such that the threaded portion 196 engages the internally threaded portion 154 of the sleeve 142 and is tightened thereon. As will be appreciated in the assembled form the threaded section 182 of the valve piston 178 extends above the cap member 194 and may be threadably engaged with the internally threaded portion 200 of a nozzle or spout 202. While the connection between the valve piston 178 and the nozzle or spout 202 is shown to be threaded, it will be apparent to those skilled in the art that any suitable tight sealing fastening means could be likewise employed.

Figure 10:
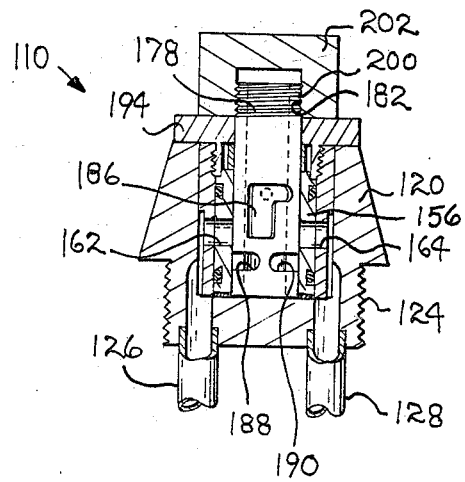
FIGURE 10 is a sectional view of the valve structure similar to FIGURE 9 showing the elements of the valve in an "off" position.
Figure 11:
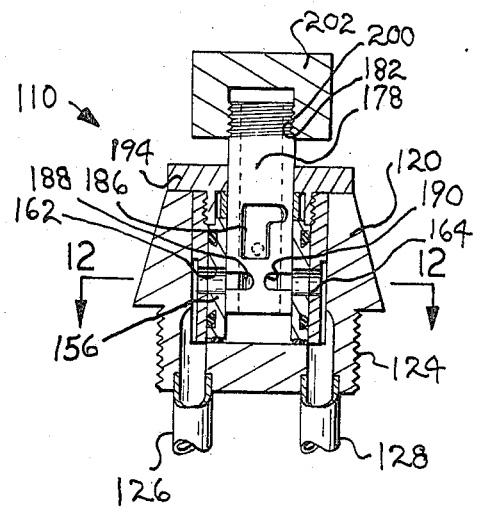
FIGURE 11 is a sectional view of the assembled form of the valve structure illustrated in FIGURE 9 illustrating the maximum flow condition.

In operation, it will be appreciated that the valve assembly illustrated in FIGURES 8 through 13, inclusive, can be opened and closed by grasping the spout 202 and lifting or moving the spout axially to control the volume of fluid and the rotational movement thereof will effect a change in the quantity of fluids being mixed therein. As illustrated in FIGURE 10, the valve piston 178 is in its lowermost position wherein the ports 188 and 190 thereof are out of alignment with the ports 162 and 164, respectively, of the valve cylinder 156 which in turn communicates with the supply lines 126 and 128. When the spout or nozzle 202 is raised, the valve piston 178 is simultaneously raised to a maximum position as illustrated in FIGURE 11 wherein the ports 188 and 190 of the valve piston 178 are in maximum alignment with the ports 162 and 164 of the valve cylinder 156 allowing for maximum flow. As will be appreciated from an examination of FIGURE 12, it will be noted that there is a balanced flow of fluid entering the system from both of the sources of fluid supply and in this condition the fluid entering the valve assembly 110 from the supply lines 126 and 128 will be of equal quantities and in the event of hot and cold water being supplied to the assembly, a mixture of like quantities of each will occur within the hollow interior of the valve piston 178 at a zone above the diverter partition wall 192.

Figure 13:
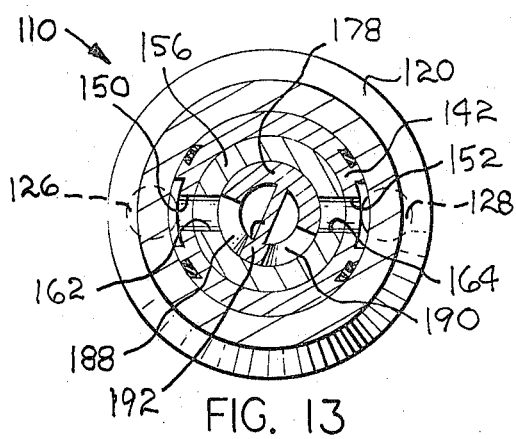
FIGURE 13 is a sectional view similar to FIGURE 12 showing the valve structure in position wherein only one of the two fluids communicating with the valve structure is permitted to pass therethrough.
Figure 8:
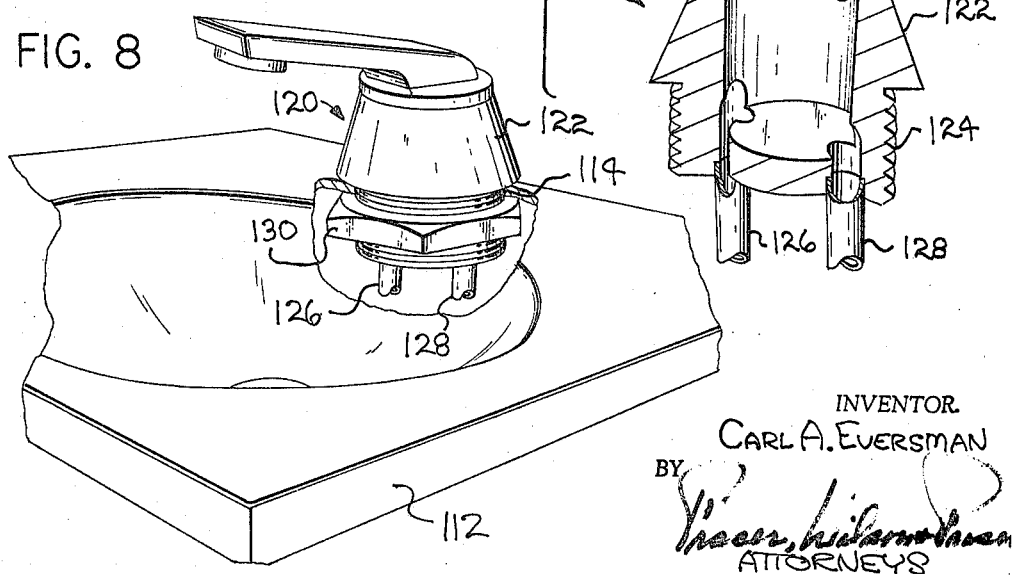
FIGURE 8 is a fragmentary perspective view similar to FIGURE 1 showing a modified form of the fluid control mixing valve.

In the event the spout or nozzle 202 is maintained at the same axial position and rotated in a clockwise direction to the position illustrated in FIGURE 13, the volume of uid passing through the assembly will be unchanged, but the introduction of the fluid passing through the pipe 128 will be cut-off and only the fluid passing through the pipe 126 will be permitted to pass through the valve assembly 110. It must be further appreciated that in the position of the valve elements shown in FIGURE 13, the innermost end of the set screw 160 would be in the upper left-hand corner of the slotted zone 186 and could be maintained in this full hot or cold position. If the nozzle or spout 202 were rotated in a counterclockwise direction to the fullest extent, the fluid in the pipe 128 would be cut off and only the fluid in the pipe 126 would be permitted to flow through the valve assembly 110. It must be understood that the valve inlet ports 188 and 190 are so formed that the total volume of fluid entering the mixing zone within the hollow interior of the valve piston 178 remains constant.

In the case of a hot and cold water system, rotational movement of the nozzle or spout 202 and its associated valve piston 178 will effect a change in the temperature of the water emitted from the valve structure directly in relation to the degree of rotational movement between the extreme positions thereof. When the nozzle or spout 202 is in one of its extreme positions, the temperature of the water emitted will be hot and, as the nozzle or spout 202 is rotated toward the opposite extreme position, the water emitted will become tepid and finally cold as the nozzle or spout and the valve piston arrive at the opposite extreme position. Axial movement of the nozzle or spout 202 and the associated valve piston 178 will effect a change in the volume or amount of water emitted.

The spout or nozzle 202 can be lowered to the shut-off position and moved to the cold water side, wherein the innermost end of the inwardly projecting set screw 160 engages the upper lateral extension of the slot 186 and is retained in such position. Manifestly, when the spout or nozzle 202 is in this position, it will not obstruct the basin area and will facilitate the use of the basin during the brushing of ones teeth, washing of ones hair, washing articles of clothing and the like.

While the valve structures illustrated and described hereinabove have been directed primarily to vertically disposed valves, it will be understood by those skilled in the art that the valve structure could likewise be satisfactorily employed in a horizontal disposition.

From the above description it will be appreciated that by forming the valve structure in the described manner, the moving part or parts of the valve, that is the valve cylinder and/or the valve piston, may be removed and replaced in case of undue wear. This can be readily accomplished without requiring the entire valve structure to be replaced, thereby saving considerable expense and time.

What I claim is:

1. A fluid control mixing valve structure comprising:
   a valve cylinder having a pair of circumferentially spaced inlet ports communicating respectively with a first and second source of fluid;
   a hollow cylindrical valve piston disposed within said valve cylinder for axial and rotational movement therein, the peripheral inner wall of said valve cylinder and the peripheral outer wall of said valve piston being in fluid-tight relation, said valve piston having an outlet port at one end thereof and a pair of circumferentially spaced inlet ports in the cylindrical wall thereof, a deflecting partition wall disposed in the interior of said valve piston between the inlet ports thereof;
   means for limiting the axial and rotational movement of said valve piston relative to said valve cylinder; and
   a manual actuator affixed to said valve piston whereby axial and rotational movement of said valve piston can be affected to selectively position the inlet ports thereof relative to the respective inlet ports of said valve cylinder.

2. A fluid control mixing valve as defined in claim 1 wherein said valve cylinder includes an outer shroud and a removable inner cylindrical sleeve sealingly disposed therewith.

3. A fluid control mixing valve as defined in claim 2 wherein the inner peripheral wall of said sleeve is finished to provide an extremely smooth surface.

4. A fluid control mixing valve as defined in claim 2 wherein grooves are formed on the outer peripheral surface of said sleeve surrounding the inlet ports thereof, and further including an O-ring seal at least partially disposed within each of said grooves.

5. A fluid control mixing valve as defined in claim 4 wherein said grooves are annular in shape and generally coaxial with the inlet ports of said sleeve.

6. A fluid control mixing valve as defined in claim 5 wherein the innermost wall of said annular grooves is undercut to adequately retain the associated one of said O-ring seals.

7. A fluid control mixing valve as defined in claim 4 wherein said O-ring seals are formed of a resilient material.

8. A fluid control mixing valve as defined in claim 2 wherein the inlet ports in the cylindrical wall of said valve piston are arranged relative to the inlet ports of said valve cylinder so that at any given axial position of said valve piston a constant volume of fluid will flow therethrough regardless of the rotational movement of the said valve piston relative to said valve cylinder.

9. A fluid control mixing valve as defined in claim 2 wherein said means for limiting the axial and rotational movement of said valve piston relative to said valve cylinder includes a slotted zone on the outer peripheral surface of said valve piston and stop means projecting inwardly from the inner wall of said valve cylinder into the slotted zone whereby relative movement of said piston is limited by the shape of the zone.

10. A fluid control mixing valve comprising:
   a valve cylinder and a relatively movable hollow valve piston disposed within said valve cylinder, said valve cylinder and said valve piston having interconnecting fluid conducting passageways, said valve cylinder communicating with a source of pressure fluid; and
   spout outlet means operatively connected to said valve piston for effecting relative axial and rotational movement between said valve cylinder and said valve piston whereby the discharge of the pressure fluid from the source through said spout outlet is controlled.

References Cited

UNITED STATES PATENTS

| 1,943,865 | 1/1934 | Hennessey | 137—625.17 |
| 2,623,752 | 12/1952 | Wentz et al. | 137—616.3 XR |
| 3,103,231 | 9/1963 | Moen | 137—625.17 XR |
| 3,119,593 | 1/1964 | Zawacki et al. | 251—175 XR |

FOREIGN PATENTS 270,979    5/1927    Great Britain.

WALTER A. SCHEEL, Primary Examiner

R. I. SMITH, Assistant Examiner

U.S. Cl. X.R.

137—616.3